United States Patent [19]

Kollmar et al.

[11] 3,928,128

[45] Dec. 23, 1975

[54] METHOD FOR ERECTING AND OPERATING AT LEAST TWO NUCLEAR REACTORS

[75] Inventors: Walter Kollmar; Hans Märkl; Klaus Thieme, all of Erlangen, Germany

[73] Assignee: Siemens Aktiengesellschaft, Munich, Germany

[22] Filed: June 28, 1973

[21] Appl. No.: 374,315

[30] Foreign Application Priority Data
July 26, 1972  Germany............................ 2236780

[52] U.S. Cl. ................................................ 176/30
[51] Int. Cl. ............................................ G21c 19/20
[58] Field of Search ......................... 176/68, 30–32, 176/87, 39

[56] References Cited
UNITED STATES PATENTS
3,336,201  8/1967  Graham ................................ 176/30

3,513,070  5/1970  Margen et al......................... 176/31

FOREIGN PATENTS OR APPLICATIONS
634,800  1/1962  Canada................................ 176/30

OTHER PUBLICATIONS

Nuclear Engineering, Vol. 12, No. 135, Aug., 1967, Tandoin, BWR/BHWR, Fueling, P. H. Margen & I Haga.

*Primary Examiner*—Samuel Feinberg
*Attorney, Agent, or Firm*—Kenyon & Kenyon Reilly Carr & Chapin

[57] ABSTRACT

The invention concerns nuclear reactors with replaceable fuel elements. According to the invention, parts of the reactor core burned up in a first nuclear reactor are used for the first core of a second nuclear reactor. This permits considerable savings, particularly in pressurized-water reactors.

7 Claims, 1 Drawing Figure

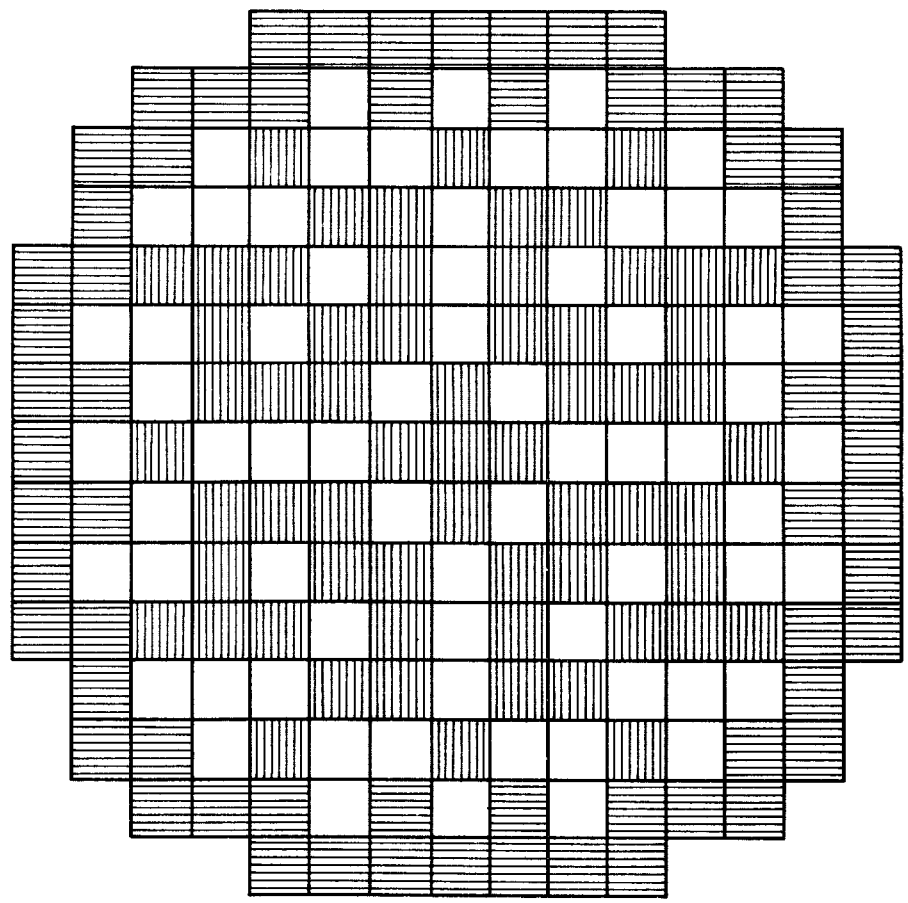

METHOD FOR ERECTING AND OPERATING AT LEAST TWO NUCLEAR REACTORS

BACKGROUND OF THE INVENTION

It is known to assemble the reactor cores of nuclear reactors for power generation, particularly of light-water reactors, from several groups of exchangeable fuel elements of identical outside dimensions, which have different concentrations. After one burning or fuel element cycle, the fuel elements are replaced or relocated, in order to obtain good utilization and a uniform distribution of power over the reactor core.

According to the German Offenlegungsschrift No. 2,008,723, the fuel elements are to be changed when they are relocated, specifically, by removing or interchanging individual fuel rods in the fuel elements, so that the ratio of fuel to hydrogen, which determines the reactivity, is matched to the consumption. The changed fuel elements can also be inserted, as is stated among other things in the Offenlegungsschrift, into other nuclear reactors. How and to what extent, however, is left open. First of all, the changing of fuel elements presupposes facilities for the handling of radiating material, which are normally not available in common nuclear reactors. It is therefore hardly possible to avoid shipment to a fuel element factory, which in view of the radiation requires a large expense, in addition to the processing.

SUMMARY OF THE INVENTION

It is an object of the invention to improve the utilization of the fuel of nuclear reactors without the necessity to process the irradiated fuel elements mechanically. In this connection, it should be taken into consideration that the cost of fuel elements is already determined to a very large extent by fabrication costs (about 30%).

Starting out with a method for erecting and operating at least two nuclear reactors with reactor cores, particularly light-water reactors, which cores comprise several groups of replaceable fuel elements with identical outside dimensions but different concentrations, the invention consists of the provision that the first nuclear reactor is erected and is operated for the duration of at least one fuel element cycle, and that the second nuclear reactor is erected and completed after the end of the fuel element cycle of the first reactor and is then equipped with a reactor core which consists 10 to 50%, and preferably 20 to 40% of fuel elements of the first nuclear reactor, which have been burned up during one fuel element cycle and are built into the second reactor without mechanical processing.

BRIEF DESCRIPTION OF THE DRAWING

The single FIGURE of the accompanying drawing is a diagram of one embodiment of the invention.

DESCRIPTION OF THE PREFERRED EMBODIMENTS

In the case of the present invention the group of fuel elements, which would otherwise be removed from a nuclear reactor and would perhaps be shipped for reprocessing and which customarily exhibits the lowest multiplication factor $k_\infty$, is used as part of the first core of a new nuclear reactor. A substantial part of the costs of the first core is thereby saved for this nuclear reactor. At the same time, the invention makes possible greater and therefore, more economical consumption of the part of the core which is relocated from the first to the second nuclear reactor. The additional expenditure, therefore, is kept within conceivably low limits, as only the fuel elements as a whole need to be transported from the first to the second nuclear reactor, but need not be disassembled and reassembled in a fuel element factory. The invention is particularly advantageous for so-called twin installations, in which two practically or completely identical reactors are erected in the immediate vicinity of each other. As the two units are in general not completed at the same time, but are completed with an intervening time interval, the method according to the invention can be used here to particular advantage, as the distance for the transport of the fuel elements from the first to the second nuclear reactor is conceivably short.

A further advantage of the method is seen in the fact that the reused fuel elements are burned out less at their upper and lower ends than in their centers. This has as a result a flattening of the axial power density distribution, which in the normal case is of cosine shape, of the first core of the second reactor, as is achieved otherwise only in later burning cycles or with axial gradation of the fuel concentrations. Because of the improved form factor, the total output can be increased already during the first fuel element cycle to the values of equilibrium operation without decreasing the usual margins of safety.

The invention can advantageously be realized in such a manner that the first nuclear reactor is operated in a manner known per se with at least three goupps of fuel elements of different concentration, and that the groups of fuel elements used for the second nuclear reactor are relocated in the first nuclear reactor after a first fuel element cycle and run there through a second fuel element cycle before they are placed in the second nuclear reactor. This means that also that group of fuel elements which, according to the practice common at present, are burned out during two fuel element cycles, can be utilized still better by transferring them from the first to the second nuclear reactor. In order to improve the utilization, the fuel elements can be provided with a concentration which is not designed for the first nuclear reactor but takes into consideration also the second nuclear reactor, so that optimum results are obtained.

In principle, however, all fuel elements which have not yet reached the maximum technologically permissible burnout can be used in a new reactor for another cycle. This is important also for plutonium fuel elements, particularly with steel charge tubes. Plutonium fuel elements are made with higher concentrations because of the high fuel element manufacturing costs. The heavy undermoderation occasioned by this disappears with high burnout. It is therefore logical to reuse just these fuel elements with the method according to the invention, as long as an increase in burnout is technologically possible.

It is advisable to distribute the fuel elements of the first nuclear reactor, inserted into the second nuclear reactor, over the cross section of the reactor core, in order to obtain uniform power distribution. The optimum distribution can be determined by calculation. In spite of the distributed arrangement, which leads to a mixture with other fuel elements, the fuel elements coming from the first nuclear reactor should be concentrated approximately in the center of the second nuclear reactor.

Besides the advantages mentioned above, the invention makes further savings possible, as the second nuclear reactor can be operated without combustible poisons which are otherwise necessary in order to keep the boron concentration required in pressurized-water reactors for compensating the reactivity of the first core, so low that the reactivity coefficient of the coolant temperature is negative. Combustible poisons, which are provided in other nuclear reactors for other reasons, can likewise be reduced or even saved altogether. Thus, one saves the poisons themselves and in addition, simplifies the control procedure of the second nuclear reactor.

The fuel elements placed in the second nuclear reactor are given preferably a fission gas space designed for three fuel element cycles, as they are used for the generation of power longer than is otherwise customary for first cores. For the same reason a fuel density of the fuel elements designed for three fuel element cycles is advisable for the second nuclear reactor.

The use of the invention is also advantageous in nuclear reactors which are operated with heavy water as the coolant and/or the moderator, as it makes possible a more favorable power density distribution at the start of the first cycle without gradation of the concentration of the new fuel elements. The second reactor can therefore be switched to full load after a shorter period of operation at partial load than the first nuclear reactor, whose fuel elements form in part the first core of the second nuclear reactor.

The invention can also be applied to more than two nuclear reactors, for instance, according to the following scheme:

|  | Start of Operation | Low concentration |  | Medium concentr. | High concentr. |
|---|---|---|---|---|---|
| Reactor I | 1974 | 1 | (new) | 2 (new) | 3 (new) |
| Reactor II | about 1976 | 1 from I | (old) | 2 (new) | 3 (new) |
| Reactor III | about 1977 | 2 from I | (old) | 2 (new) | 3 (new) |
| Reactor IV | about 1978 | 2 from II | (old) | 2 (new) | 3 (new) |
| Reactor V | about 1979 | 2 from III | (old) | 2 (new) | 3 (new) |

In the attached drawing, the disposition plan for the fuel elements of the first cycle of the second nuclear reactor is shown as an example. The fuel elements coming from the first nuclear reactor, which amount to one-third of the first core of the second reactor, are left unshaded in the drawing, while the second group with higher concentration is shaded up and down and the group with the still higher concentration is shaded transversely. It will be seen that the fuel elements coming from the first nuclear reactor are distributed in chessboard fashion over the cross section of the core shown. However, they are concentrated in the center, inasmuch as they are completely surrounded by the third fuel element group with the highest concentration.

What is claimed is:

1. Method for erecting and operating at least two light-water nuclear reactors which are substantially identical to each other and with reactor cores which comprise several groups of fuel elements with identical outside dimensions but different concentrations, and which elements each comprise an assembly of fuel rods; characterized by the feature that the first nuclear reactor is erected and operated for the duration of at least one fuel element cycle, and that the second nuclear reactor is erected and completed after the end of the fuel element cycle of the first reactor, and is then equipped with a reactor core which consists 10 to 50%, and preferably 20 to 40%, of unchanged fuel elements of the first nuclear reactor, which have been burned down during one fuel element cycle.

2. Method according to claim 1, characterized by the feature that the first nuclear reactor is operated with at least three groups of fuel elements with different concentration and that the group of fuel elements used for the second nuclear reactor is relocated after a first fuel element cycle in the first nuclear reactor and run there through a second fuel element cycle and thereafter used in the second nuclear reactor.

3. Method according to claim 1, characterized by the feature that the fuel elements of the first nuclear reactor placed in the second nuclear reactor are distributed over the cross section of the reactor core.

4. Method according to claim 1, characterized by the feature that the second nuclear reactor is operated without combustible poisons.

5. Method according to claim 1, characterized by the feature that the fuel elements used in the second nuclear reactor are given a fission gas space designed for three fuel element cycles.

6. Method according to claim 1, characterized by the feature that the fuel elements placed in the second nuclear reactor are given a fuel density designed for three fuel element cycles.

7. Method according to claim 1, characterized by the use of fuel elements with highly concentrated plutonium and combustible poison in steel tubes.

* * * * *